E. R. Thompson,
Straw Cutter.
No. 87,602.      Patented Mar. 9, 1869.
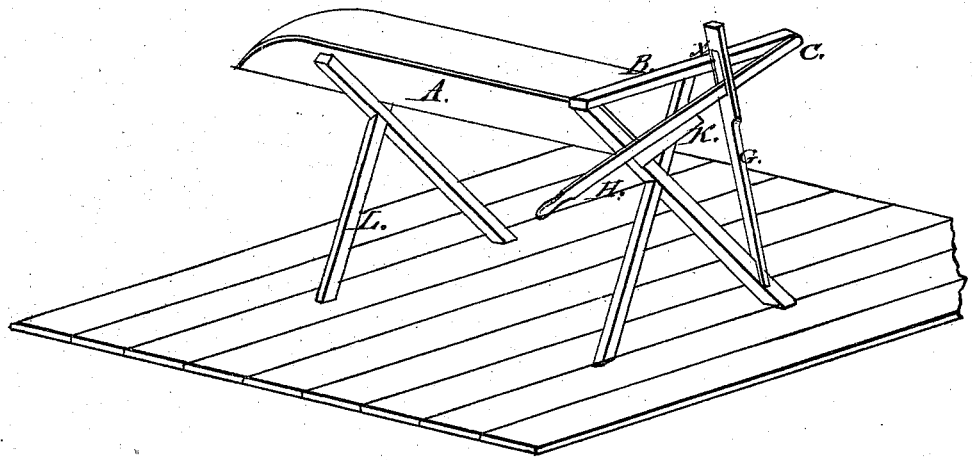
Witnesses:
E. J. M. Kuntze
James A. Park
Inventor:
Edward R. Thompson
by Ja. Park
Attorney

EDWARD R. THOMPSON, OF LANSING, MICHIGAN.

*Letters Patent No. 87,602, dated March 9, 1869.*

IMPROVEMENT IN STRAW-CUTTER.

The Schedule referred to in these Letters Patent and making part of the same.

Be it known that I, EDWARD R. THOMPSON, of Lansing, county of Ingham, and State of Michigan, have invented a new and useful Improvement in Straw-Cutters; and I do hereby declare that the following is a full, clear, and exact description thereof, reference being had to the accompanying drawings, and to the letters of reference marked thereon.

The nature of the invention consists in securing a straight knife, (the length of which is equal to the width of the top of the V-box,) to a straight lever, which is hinged in a plane with the top of the box.

The draw of the knife on the straw is sufficient to cut it, with a very slight downward pressure of the lever, which is operated by the hand, and the space through which the hand moves with each stroke of the lever, is so limited that the straw can be cut very rapidly.

The box A is V-shaped, and is supported by two legs, at each end, which are crossed in the form of an X, and framed together.

An upright guide, G, has one end secured to one of the front legs, and the other to the top piece B.

The top piece B is secured to the front end of the box A, on the upper ends of the front legs L′ L″, and the end (to which the guide G is secured) projects off in a plane with the top of the box, and to it, at C, is loosely bolted the end of the straight cutting-lever H, to which is secured, near the handle, a straight cutting-knife, K.

The guide G keeps the knife in position, to cut close and clean the straw that is projected out of the end of the box with each downward stroke of the lever H.

I am aware that the use of a V-shaped straw-box is not new in itself, nor do I therefore wish to broadly claim it. For the same reason I disclaim the individual features of a straight lever, with a straight knife attached, of an extended top bar, for the attachment of the pivoted lever, and of a guide-standard for the same; but What I do claim as new, and desire to secure by Letters Patent, is—

The combination and arrangement of the V-shaped box A, straight lever and straight knife, extended top bar, and guide-standard, substantially as shown and described, and for the purpose set forth.

EDWARD R. THOMPSON.

Witnesses:
E. LONGYEAR,
J. A. PARK.